Patented Aug. 9, 1932

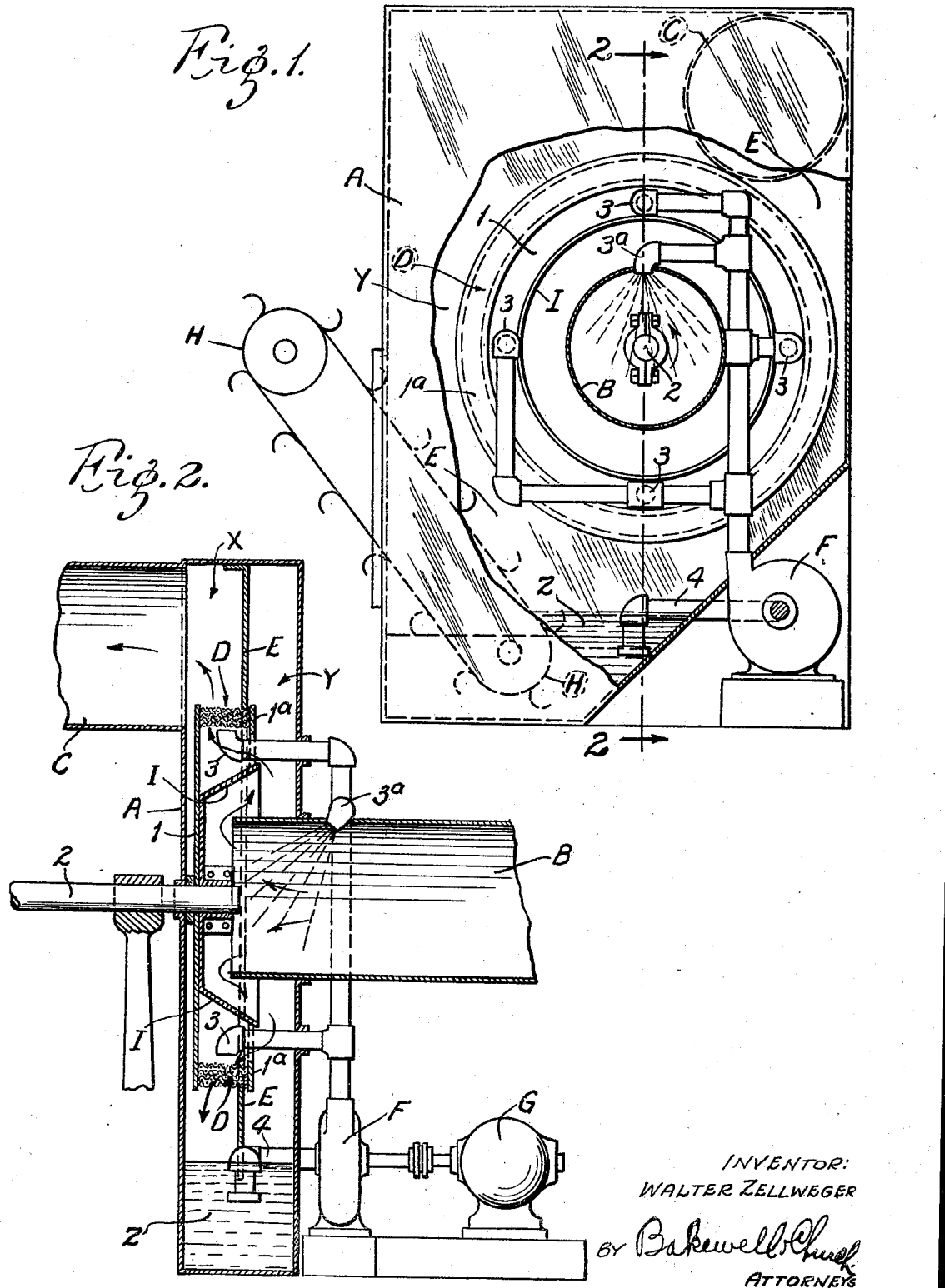

1,871,022

UNITED STATES PATENT OFFICE

WALTER ZELLWEGER, OF ST. LOUIS, MISSOURI

APPARATUS FOR REMOVING SOLID MATTER FROM AIR AND GASES

Application filed August 18, 1930. Serial No. 476,049.

This invention relates to apparatus of the kind that are used for cleaning, purifying or removing solid matter from air or gases, and particularly to apparatus of the general type mentioned that comprise a rotatable filtering device of cylindrical form, constructed of fine mesh material, for effecting the separation or removal of fine or small particles of solid matter from the air or gases being cleaned.

The main object of my invention is to provide an apparatus of the general type mentioned, that can be successfully used for cleaning air or gases containing relatively large particles of solid matter, without liability of clogging or injuring the porous filtering device.

Another object is to provide an air or gas cleaning apparatus of the type comprising a filter ring, which is equipped with a means for effecting the removal of condensible fumes or vapors in the gas stream before the gas stream passes through the filter ring.

And still another object of my invention is to provide an air or gas cleaning apparatus having the desirable characteristics above mentioned, that is reliable in operation and inexpensive to construct. Other objects and desirable features of my invention will be hereinafter pointed out.

Figure 1 of the drawing is a side elevational view partly broken away of an apparatus embodying my invention; and Figure 2 is a vertical sectional view of said apparatus, taken on the line 2—2 of Figure 1, looking in the direction indicated by the arrows.

I have herein illustrated my invention embodied in an apparatus in which the removal of fine or small particles of solid matter from a gas stream is effected by means of a rotatable, cylindrical filter ring to which a liquid is applied so as to dislodge or remove particles that collect on the filter ring, but I wish it to be understood that my invention is applicable to various types and kinds of apparatus which have for their object the removal or separation of solid matter from a gaseous stream, which may either consist of air laden with dust or the like; flue gases or furnace gases that contain dust, ash or other particles of solid material and also various other kinds of gaseous streams escaping from industrial apparatus and containing dust, lint and fibrous particles which it is necessary or desirable to remove prior to making use of the gas stream or permitting it to escape into the atmosphere.

In the accompanying drawing A designates a closed casing or housing, preferably of substantially rectangular shape or form and provided with an inlet pipe B through which a gaseous stream containing particles of solid matter is introduced into the casing A, and an eduction pipe C through which the gaseous stream is discharged from the casing after the particles of solid matter have been removed from the stream. A filtering device D consisting preferably of a rotatable, cylindrical filter ring constructed of fine mesh material, is arranged inside of the casing A at a point between the inlet and outlet of the casing. A vertically-disposed imperforate disk 1 that is attached to a horizontally-disposed drive shaft 2, driven by any suitable source of power, serves as a carrier for the cylindrical filter ring D, which projects laterally from one side of said disk, as shown in Figure 2.

The inlet pipe B is herein illustrated as terminating inside of the filter ring D, preferably at approximately the center of same, and the eduction pipe C leads from the casing at a point beyond or outside of the filter ring. At approximately the center of the casing A is a vertically-disposed partition plate E provided with a center opening whose edge terminates in close proximity to the outer surface of the filter ring D, said partition plate being attached to the walls of the casing A in such a way that it divides the interior of the casing into two separate and distinct chambers, to wit, a high pressure chamber $x$ from which the eduction pipe C leads, and a low pressure chamber $y$ that communicates with the inlet pipe B and with the interior of the filter ring D. The partition plate E is so disposed with relation to the filter ring that substantially the entire area of said ring is located within the high pressure chamber x. When the filter ring D revolves the natural path of travel of the gaseous stream being cleaned is radially from the discharge end of the inlet pipe B, thence through the filter ring into the high pressure chamber x, and thence through the eduction pipe C. The rotary movement of the filter ring causes the air or gas to be discharged by centrifugal force through the filter ring, into the chamber x, where the pressure is sufficiently high to eliminate the possibility of the air or gas by-passing from the low pressure chamber y, through the joint between the partition plate E and the outer surface of the filter ring. The filter ring D is provided at its right hand end or edge with a side plate 1ª that preferably overlaps the partition plate, as shown in Figure 2. This is a very desirable form of construction for an air or gas cleaning apparatus of the type that is equipped with a rotatable filter ring of cylindrical form, as it eliminates the possibility of air or gas traveling through the apparatus without passing through the filter ring, and it overcomes the necessity of using a sealing device in rubbing contact with the front end of the filter ring to prevent the air or gas from short-circuiting or by-passing the front end of the filter ring, as would be necessary if the front end of the filter ring terminated inside of a high pressure chamber, instead of terminating inside of a low pressure chamber, as herein shown. While this feature of my invention is particularly applicable to an apparatus equipped with a knock-out device for removing relatively large or heavy particles of solid matter from the air or gas stream, it is not limited to use with apparatus of the particular type or kind mentioned.

One or more jets or sprays of a liquid, such as water, are discharged onto the inner surface of the filter ring, so as to wash off or dislodge from the filter ring particles of solid matter which have lodged on the filter ring during the passage of the gaseous stream through the filter ring. In the apparatus herein illustrated a centrifugal pump F is used for supplying wash water to a plurality of nozzles or spraying devices 3 arranged so as to discharge onto the inner surface of the filter ring D, the pump F being driven by an electric motor or other suitable source of power G. The water that is discharged onto the filter ring passes through the same or is thrown off from said ring and falls downwardly into a reservoir or sump at the lower end of the casing A which serves as a settling basin that holds a body of water z. If the bottom edge of the partition plate E terminates above the bottom wall of the casing A, as herein illustrated, the body of water z in the settling basin seals said partition plate, and thus cuts off communication between the two chambers x and y in the casing A. The solid matter that collects in the settling basin is removed automatically from same by a bucket conveyor H, shown in Figure 1, and the intake 4 of the pump F is submerged in the water in the settling basin so as to permit the wash water to be recirculated through the apparatus.

Many gaseous streams that require cleaning or purification contain relatively coarse or large particles of solid matter, which, if projected onto a filtering device made of fine mesh material, would be apt either to clog the same, or cut or destroy the filtering material. In order that my apparatus will successfully handle gaseous streams of the kind mentioned, I have equipped the apparatus with a shield, baffle or knock-out device I arranged in the path of travel of the inflowing gaseous stream and disposed at any preferred point in advance or in front of the filter ring D, for the two-fold purpose of intercepting relatively large or heavy particles of solid matter in the gas stream before the gas stream reaches the filter ring, and causing said intercepted particles to be discharged outside of the filter ring.

Said baffle or knock-out device I may be constructed, operated and arranged in various ways without departing from the spirit of my invention. It is herein illustrated as consisting of an imperforate frusto-conical-shaped member arranged inside of the filter ring D in concentric relation with the inlet pipe B, and so proportioned or designed that the gas stream escaping from the inlet pipe will impinge upon or strike against the inclined portion of said device I and be discharged from the peripheral edge of said device, with the result that the large or heavy particles of solid matter in the gas stream will not only be knocked out of same before the gas stream reaches the inner surface of the filter ring, but will also be discharged outside of the filter ring. When the apparatus is in operation the gas stream that escapes from the inlet pipe B is freed from large-sized particles of solid matter that might clog or injure the filter ring by means of the device I, and thereafter the small or fine particles of solid matter in the gas stream are effectively removed from same during the passage of the gas stream through the filter ring. In the form of my invention herein illustrated, the particles of solid matter intercepted by or knocked out of the gas stream by the device I are discharged tangentially from the periphery or end of said device into the chamber y in the casing A, and fall downwardly into the settling basin at the lower end of the casing. Usually, the baffle or knock-out device I will be constructed of metal or other suitable material that will not cut or wear rapidly, due to the abrading action of the particles of solid matter on same, and if desired, a nozzle or spraying device 3ª may be provided for applying wash water or other suitable liquid to the impact surface of the device I, for the twofold purpose of removing or flushing off particles of solid matter on the device I and also maintaining the impact surface of said device in a sufficiently moist state to insure its functioning as a collecting surface for the particles of solid matter that strike against same. As shown in Figure 2, the substantially cone-shaped knock-out device I is carried by the disk 1 that supports the filter ring D, but, as previously stated, the knock-out device can be arranged and operated in various other ways without departing from the spirit of my invention. In addition to effecting the removal of relatively coarse or large particles of solid matter from the gas stream, the device I has a tendency to remove condensible fumes or vapors that might tend to clog or impair the efficiency of the filter ring. For example, if flue gases are being handled in the apparatus, the device I tends to absorb sulphur fumes and cool and condense tar vapors before the gas stream reaches the filter ring. It should be noted that when the apparatus is in operation all of the gases, water and solid particles which impinge upon the device I are discharged tangentially from the periphery of said device into a low pressure chamber that is in direct communication with the inner side of the filter ring, and that the gases, after being freed of the solid particles, pass through the filter ring, and thence through the eduction pipe or outlet C.

With an apparatus of the construction above described many gaseous streams containing solid matter can be successfully handled without liability of injuring or impairing the efficiency of that portion of the apparatus, to wit, the filter ring, which is relied upon to effect the removal of fine particles of solid matter in the gas stream, due, of course, to the fact that the gas stream, in traveling through the apparatus, impinges upon or strikes against an imperforate device I that knocks the relatively large or heavy particles of solid matter out of the gas stream before the stream reaches the filter device, and also causes said intercepted particles to be discharged outside of the filter ring or thrown clear of the filter ring. Such an apparatus is inexpensive to construct, it is of sufficiently simple design to insure its remaining in operative condition with minimum trouble or attention, and it is of such construction that dust cannot cake or build up on the internal surfaces of the apparatus, particularly when fly ash is being handled in the apparatus, this being due to the thorough scrubbing action which the filter ring, knock-out device and other internal surfaces are subjected to when the apparatus is in operation.

Having thus described my invention, what I claim as new and desire to secure by Letters Patent is:

1. An apparatus for the purpose described, comprising a casing provided with an inlet pipe and an eduction pipe, a rotatable, cylindrical filter ring arranged in said casing between the discharge end of the inlet pipe and the inlet end of the eduction pipe, and a rotatable knock-out device positioned between the inner side of said ring and the discharge end of the inlet pipe and disposed so that the solid particles in the gas stream intercepted by said device will be discharged at a point outside of the filter ring.

2. An apparatus for the purpose described, comprising a casing provided with an inlet pipe and an eduction pipe, a rotatable, cylindrical filter ring arranged in said casing between the discharge end of the inlet pipe and the inlet end of the eduction pipe, a knock-out device arranged to revolve with the filter ring and positioned between the inner side of said ring and the discharge end of the inlet pipe in such a way that the solid particles intercepted by said device will be discharged at a point outside of the filter ring, said knock-out device being substantially cone-shaped, and means for applying a liquid to the inner surface of said knock-out device and to the inner surface of said filter ring.

3. An apparatus for the purpose described, comprising a casing, a rotatable filter ring arranged inside of said casing, an inlet pipe terminating inside of said ring through which a gaseous stream containing particles of solid matter is introduced into the casing, an eduction pipe leading from the casing at a point beyond or outside of the filter ring, and a substantially cone-shaped imperforate baffle arranged to revolve with the filter ring and interposed between the inner side of same and the discharge end of said inlet pipe.

4. An apparatus for the purpose described, comprising a casing, a rotatable filter ring arranged inside of said casing, an inlet pipe terminating inside of said ring through which a gaseous stream containing particles of solid matter is introduced into the casing, an eduction pipe leading from the casing at a point beyond or outside of the filter ring, a substantially cone-shaped imperforate baffle arranged to revolve with the filter ring and interposed between the inner side of same and the discharge end of said inlet pipe, devices for discharging a washing liquid onto said filter ring and baffle, and means for using said washing liquid over and over again.

5. In an apparatus for the purpose described, the combination of a rotatable, cylindrical filter ring arranged in the path of travel of a gaseous stream that contains particles of solid matter, a pipe from which the gases are discharged, a substantially cone-shaped, rotatable baffle arranged in concentric relation with the filter ring at a point intermediate said pipe and the inner side of said ring for intercepting relatively large particles of solid matter suspended in the gas stream and causing the gases and said intercepted particles to be discharged tangentially from the peripheral edge of said baffle, and means for applying a liquid to said filter ring and baffle for the purpose described.

6. An apparatus of the general type described, comprising a casing provided with a high pressure chamber and a low pressure chamber, a rotatable, cylindrical filter ring arranged inside of said casing with its inner side in direct communication with said low pressure chamber and with its outer side in direct communication with said high pressure chamber, means for discharging a washing liquid onto said filter ring, means for admitting gases to said low pressure chamber, and a peripheral discharge knock-out device arranged in said low pressure chamber at a point intermediate the inner side of said filter ring and said gas admitting means.

7. An apparatus of the general type described, comprising a casing provided with a high pressure chamber and a low pressure chamber, a pipe from which gases are discharged into said low pressure chamber, a rotatable, cylindrical filter ring arranged inside of the casing with the major portion of its outer surface communicating with the high pressure chamber, and a rotatable knock-out device for intercepting relatively large solid particles in the gas stream, arranged at a point intermediate said gas pipe and the inner side of said filter ring and disposed so that the gases and said solid particles will be discharged from the periphery of said device.

WALTER ZELLWEGER.